US010367265B2

(12) United States Patent
Richardson et al.

(10) Patent No.: US 10,367,265 B2
(45) Date of Patent: Jul. 30, 2019

(54) MAGNETIC COMMUNICATION METHOD

(71) Applicant: QUALCOMM Incorporated, San Diego, CA (US)

(72) Inventors: Laurence Richardson, Ely (GB); Mayank Batra, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/230,045

(22) Filed: Aug. 5, 2016

(65) Prior Publication Data

US 2018/0040954 A1   Feb. 8, 2018

(51) Int. Cl.
| | |
|---|---|
| *H04L 27/00* | (2006.01) |
| *H01Q 3/44* | (2006.01) |
| *H01Q 1/24* | (2006.01) |
| *H01Q 7/00* | (2006.01) |
| *H04B 5/00* | (2006.01) |
| *H04B 14/00* | (2006.01) |

(52) U.S. Cl.
CPC .............. *H01Q 3/44* (2013.01); *H01Q 1/241* (2013.01); *H01Q 7/00* (2013.01); *H04B 5/0075* (2013.01); *H04B 14/006* (2013.01)

(58) Field of Classification Search
CPC ...... H04Q 5/0075; H01Q 5/0075; H04B 3/54; H04L 25/4902
USPC ........ 375/259, 295; 324/251, 252, 260, 259, 324/295
See application file for complete search history.

(56) References Cited

U.S. PATENT DOCUMENTS

| | | | |
|---|---|---|---|
| 8,340,577 B2 | 12/2012 | Griffin et al. | |
| 8,729,892 B2 | 5/2014 | Friedrich | |
| 2004/0203381 A1 | 10/2004 | Cahn et al. | |
| 2008/0013920 A1* | 1/2008 | Plourde, Jr. ............. | H04N 5/76 386/291 |

(Continued)

FOREIGN PATENT DOCUMENTS

GB        2488897 A        9/2012

OTHER PUBLICATIONS

Bansal R., "Near-Field Magnetic Communication," IEEE Antennas and Propagation Magazine, Apr. 2004, vol. 46 (2), pp. 114-115.

(Continued)

*Primary Examiner* — Khai Tran
(74) *Attorney, Agent, or Firm* — Muncy, Geissler, Olds & Lowe, P.C./QUALCOMM

(57) ABSTRACT

The disclosure relates to a magnetic communication method that does not use induction. For example, a transmitter device may generate a magnetic field in a controlled direction and rotate the magnetic field around one or more axes. As such, an angle according to which the magnetic field is rotated at the transmitter device may be used as a variable upon which to encode data transmitted to a receiver device that can sense a direction of the magnetic field along two or more axes. Furthermore, to achieve higher data rates, multiple rotation angles could be used to encode the data transmitted from the transmitter device to the receiver device, which may further improve security because reading and/or generating the modulated magnetic field may be increasingly difficult from any significant distance away from the transmitter device and the receiver device.

27 Claims, 5 Drawing Sheets

(56) References Cited

U.S. PATENT DOCUMENTS

| | | | |
|---|---|---|---|
| 2008/0258718 A1* | 10/2008 | Pullini | B60C 23/0425 |
| | | | 324/226 |
| 2013/0226799 A1* | 8/2013 | Raj | G07C 9/00 |
| | | | 705/44 |
| 2014/0097835 A1 | 4/2014 | Sartee et al. | |
| 2015/0116081 A1* | 4/2015 | Nair | B60R 25/04 |
| | | | 340/5.61 |
| 2015/0317869 A1* | 11/2015 | Tanimura | G07F 17/3213 |
| | | | 463/20 |
| 2016/0346671 A1 | 12/2016 | Jarchafjian et al. | |
| 2017/0045377 A1* | 2/2017 | Vallmajo | G01D 5/145 |

OTHER PUBLICATIONS

International Search Report and Written Opinion—PCT/US2017/040421—ISA/EPO—dated Oct. 13, 2017.

Jin R., et al., "MagPairing: Pairing Smartphones in Close Proximity Using Magnetometers", IEEE Transactions on Information Forensics and Security, IEEE, Piscataway, NJ, US, vol. 11, No. 6, Jun. 1, 2016, pp. 1306-1320, XP011604556, ISSN: 1556-6013, DOI: 10.1109/TIFS.2015.2505626 [retrieved on Mar. 28, 2016].

Radecki A., et al., "Rotary Coding for Power Reduction and S/N Improvement in Inductive-Coupling Data Communication", IEEE Journal of Solid-state Circuits, IEEE Service Center, Piscataway, NJ, USA, vol. 47, No. 11, Nov. 1, 2012, pp. 2643-2653, XP011470517, ISSN: 0018-9200, DOI: 10.1109/JSSC.2012.2211656.

* cited by examiner

MAGNETIC COMMUNICATION METHOD

TECHNICAL FIELD

The various aspects and embodiments described herein generally relate to proximity-based magnetic communication methods and systems.

BACKGROUND

Systems to enable communication between devices in close proximity using modulated magnetic fields already exist, notably Radio-Frequency Identification (RFID) and Near Field Communication (NFC). The existing systems tend to use magnetic induction to transmit a signal from a transmitter device to a receiver device. The fact that the transmitter device and the receiver device generally need to be in close proximity (e.g., typically within 10 centimeters from one another) is especially relevant to use cases that exploit the enhanced security that arises from the transmitter and receiver devices needing to be almost touching physically and/or the user convenience that arises from having the ability to perform "tap to connect" or "tap to select" and/or other suitable proximity-dependent functions. One specific application that systems based on magnetic communication often employ is to convey out-of-band (OOB) data between two devices in a secure manner, which can be used to authenticate a device before proceeding with pairing using another wireless technology such as Bluetooth. The OOB authentication data is typically small and well-suited to a low data rate communication mechanism. The need to have the two devices in close physical proximity also provides useful protection against intruder attacks such as man-in-the-middle (MITM) attacks and passive eavesdropping in addition to helping to ensure that a connection is only formed with the intended device.

However, the existing systems based on magnetic communication (e.g., RFID and NFC) suffer from various problems and drawbacks. For example, the existing magnetic communication systems typically require a magnetic loop antenna, which is a large and bulky component in relation to portable products that often have a small size. Furthermore, protecting the receiver device from the currents that wireless charging systems generate can be difficult due to the magnetic induction, which may present challenges with respect to creating designs that allow the magnetic communication components to co-exist with other technologies in a particular product. Further still, the magnetic loop antenna used to enable the magnetic communication can have an undesirable effect on other wireless technologies used in a product (e.g., through screening effects, capacitive coupling, inducing unwanted signals into other circuits, etc.). The existing systems may also be vulnerable to malicious devices designed to use higher than normal transmit power, directional aerials, sensitive receivers, etc. in order to provide the ability to communicate with the target either passively or actively over an extended distance, thereby undermining the security goals associated with requiring the communicating devices to be in close proximity to each other.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a magnetic communication method as described herein may enable communication between two devices via a magnetic field without using induction, thereby avoiding the need to have a magnetic loop antenna in a receiver device. As such, the magnetic communication method as described herein may enable proximity-based security, "tap" use cases (i.e., use cases initiated via the simple action of touching two devices together), and/or any other suitable use cases that may require and/or benefit from having two communicating devices in close proximity. Furthermore, the magnetic communication method as described herein may at least partially overlap with use cases that can be supported via Radio-Frequency Identification (RFID) and Near Field Communication (NFC), whereby the magnetic communication method described herein may provide an underlying transport mechanism to support applications based on RFID, NFC, and/or other suitable proximity-based technologies at higher layers in a protocol stack. For example, according to various aspects, the magnetic communication method described herein may be implemented between a receiver device and a transmitter device, wherein the transmitter device may have the ability to generate a magnetic field in a controlled direction and the receiver device may contain a magnetic sensor that can sense the direction of a magnetic field experienced at the receiver device in at least two axes. In particular, the magnetic sensor may include any suitable component(s) (e.g., Hall-effect magnetometers) that can report the direction associated with the sensed magnetic field along two or more orthogonal axes. Accordingly, when the transmitter device is placed in close proximity to the receiver device, the magnetic field generated at the transmitter device will be significantly stronger than the Earth's magnetic field at that location. In the event that the direction of the magnetic field generated at the transmitter device changes, the magnetic sensor in the receiver device may sense the new direction and report the angle to an application on the receiver device. The direction (e.g., the angle) associated with the magnetic field may therefore represent a variable upon which data can be encoded at the transmitter device and decoded at the receiver device such that the receiver device can receive data from the transmitter device.

According to various aspects, a method for transmitting data using magnetic communication may therefore comprise generating, at a transmitter device, one or more communication symbols that represent data to be transmitted to a receiver device, generating a magnetic field at the transmitter device, and rotating the magnetic field around one or more axes to encode the one or more communication symbols that represent the data to be transmitted to the receiver device. For example, in various embodiments, the one or more communication symbols may comprise one or more binary data bits. In one example encoding scheme, the magnetic field may be rotated around a first axis according to a first angle to encode a binary digit zero and rotated around the first axis according to a second angle to encode a binary digit one. Alternatively and/or additionally, the one or more communication symbols may each represent multiple data bits, in which case the magnetic field may be rotated around a first axis according to a first angle and further rotated around a second axis according to a second angle to represent each communication symbol, or the magnetic field may be rotated within a two-dimensional plane (i.e., around one axis) according to different angles that have different sizes to represent each communication symbol, or other suitable encoding schemes may be used. Furthermore, in various embodiments, timing information to recover the data represented in the one or more communication symbols may be encoded within the one or more communication symbols such that the magnetic communication between the transmitter device and the receiver device is substantially asynchronous. In various embodiments, the transmitter device may comprise a magnetic field source, wherein an electrical power source may be configured to drive the magnetic field source and to cause the magnetic field source to rotate the magnetic field. In one alternative, the magnetic field source may comprise a permanent magnet configured to generate a persistent magnetic field and one or more mechanical components coupled to the permanent magnet may be configured to cause the permanent magnet to rotate such that the persistent magnetic field rotates.

According to various aspects, a transmitter device may comprise a magnetic field source configured to generate a magnetic field and a processor configured to generate one or more communication symbols that represent data to be transmitted to a receiver device and to cause the magnetic field to rotate around one or more axes to encode the one or more communication symbols that represent the data to be transmitted to the receiver device.

According to various aspects, an apparatus may comprise means for generating one or more communication symbols representing data to be transmitted to a receiver device, means for generating a magnetic field, and means for rotating the magnetic field around one or more axes to encode the one or more communication symbols.

According to various aspects, a computer-readable medium may store computer-executable instructions, which may be configured to cause a transmitter device to generate one or more communication symbols representing data to be transmitted to a receiver device, generate a magnetic field, and rotate the magnetic field around one or more axes to encode the one or more communication symbols that represent the data to be transmitted to the receiver device.

According to various aspects, a method for receiving data using magnetic communication may comprise sensing, at a receiver device, a direction associated with a magnetic field vector experienced at the receiver device, detecting one or more rotations in the magnetic field vector experienced at the receiver device based on one or more changes in the sensed direction associated with the magnetic field vector, and decoding, at the receiver device, one or more communication symbols based on the one or more rotations in the magnetic field vector, wherein the one or more decoded communication symbols represent data received from a transmitter device configured to influence the magnetic field vector experienced at the receiver device.

According to various aspects, a receiver device may comprise a magnetic sensor configured to sense a direction associated with a magnetic field vector experienced at the receiver device and to detect one or more rotations in the magnetic vector experienced at the receiver device based on one or more changes in the sensed direction associated with the magnetic field vector and a processor configured to decode one or more communication symbols based on the one or more rotations in the magnetic field vector, wherein the one or more decoded communication symbols represent data received from a transmitter device configured to influence the magnetic field vector experienced at the receiver device.

According to various aspects, an apparatus may comprise means for sensing a direction associated with a magnetic field vector experienced at the apparatus, means for detecting one or more rotations in the magnetic field vector experienced at the apparatus based on one or more changes in the sensed direction associated with the magnetic field vector, and means for decoding one or more communication symbols based on the one or more rotations in the magnetic field vector, wherein the one or more decoded communication symbols represent data received from a transmitter device configured to influence the magnetic field vector experienced at the apparatus.

According to various aspects, a computer-readable medium may store computer-executable instructions, which may be configured to cause a receiver device to sense a direction associated with a magnetic field vector experienced at the receiver device, detect one or more rotations in the magnetic field vector experienced at the receiver device based on one or more changes in the sensed direction associated with the magnetic field vector, and decode one or more communication symbols based on the one or more rotations in the magnetic field vector, wherein the one or more decoded communication symbols represent data received from a transmitter device configured to influence the magnetic field vector experienced at the receiver device.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
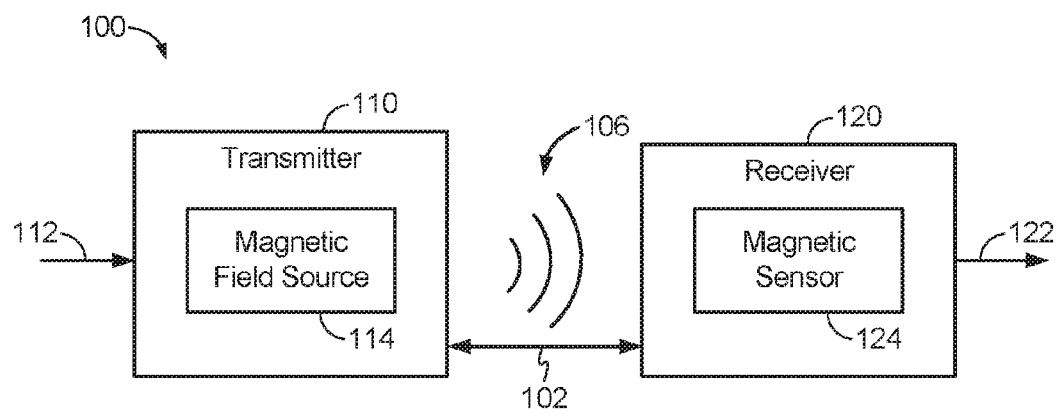
FIG. 1 illustrates an exemplary system to enable magnetic communication between a transmitter device and a receiver device, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "transmitter device" may refer to any suitable device that has capabilities to generate a magnetic field in a controlled direction and the term "receiver device" may refer to any suitable device that has capabilities to sense a direction associated with a magnetic field experienced at the receiver device. In particular, a magnetic field may be represented as a vector having a direction and a magnitude, wherein the magnetic communication methods described herein may be performed between a transmitter device that can control the direction in which a magnetic field is generated and a receiver device that can sense the direction associated with the magnetic field (as experienced at the receiver device). Accordingly, in various embodiments, the terms "transmitter device" and "receiver device" as used herein may refer to any suitable device having the above-mentioned capabilities, which may include any one or all of cellular telephones, personal data assistants (PDAs), palm-top computers, wireless electronic mail receivers and cellular telephone receivers, multimedia Internet enabled cellular telephones, and similar personal electronic devices which include a programmable processor, memory, and suitable magnetic communication components (e.g., a magnetic field source, a magnetometer, etc.). As used herein, the terms "device" and variants thereof are used interchangeably to refer to electronic devices which include one or more magnetic communication components, one or more transceivers (which may be wired or wireless), and a processor configured with software instructions to participate in the example systems described herein and perform one or more example methods described herein. Furthermore, in various use cases, a device that can generate a magnetic field in a controlled direction and also sense the direction associated with a magnetic field experienced at the device may operate as a transmitter device as described herein, a receiver device as described herein, or both. Various example devices are described in more detail below, although those skilled in the art will appreciate that the various aspects and embodiments described herein are illustrative only and that the principles described herein may broadly apply to other suitable systems and methods.

According to various aspects, FIG. 1 illustrates an exemplary system 100 in which a transmitter device 110 and a receiver device 120 may communicate according to a magnetic communication method. In particular, as will be described in further detail herein, the magnetic communication between the transmitter device 110 and the receiver device 120 may be performed without using induction, thereby avoiding the need to have a magnetic loop antenna in the receiver device 120. As such, the magnetic communication as described herein may enable the transmitter device 110 and the receiver device 120 to implement proximity-based security, "tap" use cases (i.e., use cases initiated via the simple action of touching the transmitter device 110 and the receiver device 120 together), and/or any other suitable use cases that may require and/or benefit from having the transmitter device 110 and the receiver device 120 in close proximity while communicating with one another. Furthermore, the magnetic communication between the transmitter device 110 and the receiver device 120 may at least partially overlap with use cases that can be supported via Radio-Frequency Identification (RFID) and Near Field Communication (NFC), whereby the magnetic communication between the transmitter device 110 and the receiver device 120 may provide an underlying transport mechanism to support applications based on RFID and NFC. As such, the magnetic communication as described herein may effectively replace RFID and NFC transports and thereby enable applications that implement magnetic communication without using RFID or NFC radio technology (including some that currently use RFID and/or NFC). Furthermore, the magnetic communication between the transmitter device 110 and the receiver device 120 may complement and/or support applications via Bluetooth, wireless local area network (WLAN), and/or other suitable technologies (e.g., to securely transfer out-of-band (OOB) data that can be used to establish wireless connections that use such transports).

According to various aspects, the receiver device 120 may comprise a magnetic sensor 124 that can sense a direction associated with a magnetic field 106 in a space that comprises two or more orthogonal axes (e.g., one plane with two orthogonal axes and/or a three-dimensional space having three orthogonal axes). In particular, the magnetic sensor 124 may comprise any suitable component that has the ability to report the direction associated with the sensed magnetic field 106 along the two or more orthogonal axes (e.g., multiple Hall-effect magnetometers, including one per axis, although the multiple Hall-effect magnetometers may be physically integrated into the magnetic sensor 124 as a single package). The transmitter device 110 may further include a magnetic field source 114 that can generate and rotate the magnetic field 106 in a controlled direction. For example, in various embodiments, the transmitter device 110 may control the direction of the magnetic field 106 through supplying two or more orthogonal solenoids with controlled amounts of electrical current in varying proportions (not explicitly shown in FIG. 1). However, those skilled in the art will appreciate that the direction of the magnetic field 106 may be suitably controlled in other ways. In various embodiments, the magnetic field source 114 may comprise a magnetic emitter and/or any other suitable component(s) with the ability to generate and rotate the magnetic field 106. For example, in various embodiments, the magnetic field source 114 may be an open loop transformer configured to emit a magnetic field while acting as a transformer. In another example, the magnetic field source 114 may be a permanent magnet that creates a persistent magnetic field (e.g., a rare-earth magnet). In other examples, the magnetic field source 114 may include any suitable device(s) and/or component(s) with the capability to generate and rotate the magnetic field 106 in a controlled direction, including device(s) and/or component(s) used in induction motors, wireless charging devices, etc., as will be apparent to those skilled in the art.

Accordingly, in various embodiments, the transmitter device 110 may include or be coupled to a power source 112, which may drive the magnetic field source 114 at the transmitter device 110 and thereby cause the magnetic field source 114 to generate the magnetic field 106 (e.g., in a controlled direction based on suitable instructions from an application, a processor, etc.). When the transmitter device 110 is placed in close proximity to the receiver device 120 such that a distance 102 separating the transmitter device 110 and the receiver device 120 is sufficiently small, the magnetic field 106 generated at the transmitter device 110 may be significantly stronger than the Earth's magnetic field at that location. Accordingly, in the event that the magnetic field 106 changes direction (e.g., due to the magnetic field source 114 rotating the magnetic field 106 according to a certain angle), the magnetic sensor 124 at the receiver device 120 may detect the change in direction and generate an output 122 to report the angle to an application on the receiver device 120. As such, the magnetic communication between the transmitter device 110 and the receiver device 120 may generally use the direction (e.g., the angle) associated with the magnetic field 106 as a variable upon which to encode/decode and thereby provide a mechanism through which the receiver device 120 can receive data from the transmitter device 110.

Figure 2:
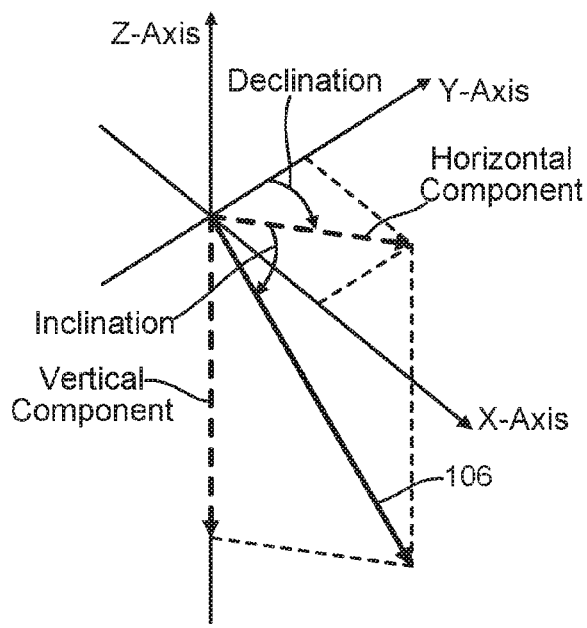
FIG. 2 illustrates exemplary features associated with a magnetic field having a direction that can be controlled at a transmitter device and sensed at a receiver device along two or more orthogonal axes, according to various aspects.

According to various aspects, FIG. 2 illustrates exemplary features associated with a magnetic field 106 to further explain the manner in which the transmitter device 110 may generate and rotate the magnetic field 106 to encode data transmitted to the receiver device 120 and to further enable the receiver device 120 to decode the data from the transmitter device 110. In particular, as mentioned above, the magnetic sensor 124 at the receiver device 120 may be configured to sense the direction associated with the magnetic field 106 along two or more orthogonal axes and to detect an angle according to which the magnetic field 106 rotates. In that context, FIG. 2 illustrates an exemplary magnetic field 106 that may be generated or otherwise represented within a coordinate space that has an x-axis, a y-axis, and a z-axis. However, those skilled in the art will appreciate that the magnetic field 106 may be suitably generated or represented within a two-dimensional space (i.e., a plane) that has two axes to enable use cases based on rotations around one axis. In the example shown in FIG. 2, the magnetic field 106 may be a vector within the coordinate space with a horizontal component that corresponds to a value associated with the magnetic field 106 projected onto a horizontal plane, as defined according to the x-axis and the y-axis in the illustrated example. Accordingly, a declination angle may represent an angle according to which the horizontal component varies from the y-axis. Furthermore, the magnetic field 106 may have a vertical component that corresponds to a value associated with the magnetic field 106 projected onto the z-axis, and an inclination angle may represent an angle according to which the magnetic field 106 varies from the horizontal plane.

In the magnetic communication between the transmitter device 110 and the receiver device 120, one or more angles may therefore be used as the variable upon which to encode data sent from the transmitter device 110 and the receiver device 120 (e.g., the declination angle, the inclination angle, etc.). In particular, the magnetic communication between the transmitter device 110 and the receiver device 120 may use a simple differential encoding scheme such that the transmitter device 110 may rotate the magnetic field 106 to represent one or more bits per symbol. For example, in one embodiment, the transmitter device 110 may rotate the magnetic field 106 clockwise according to a predetermined angle (e.g., ninety degrees) to represent a binary digit one (1) and rotate the magnetic field 106 counter-clockwise according to the predetermined angle (e.g., negative ninety degrees) to represent a binary digit zero (0). However, those skilled in the art will appreciate that other suitable encoding schemes may be suitably employed (e.g., the magnetic field 106 may be rotated counter-clockwise to represent a binary digit one and rotated clockwise to represent a binary digit zero, the rotation angle may be varied according to a known pattern, etc.). In any case, the simple differential encoding scheme may advantageously eliminate a need to establish a fixed reference position between the transmitter device 110 and the receiver device 120, which can therefore be held in any arbitrary orientation with respect to one another. Furthermore, to achieve use cases with higher data rates, the magnetic communication method may use a constellation code or other suitable techniques to encode the data communicated between the transmitter device 110 and the receiver device 120. For example, in various embodiments, the constellation code may employ more rotation angles in order to encode more than one bit per symbol (e.g., different angle sizes based on rotations around a single axis such that multiple bits can be encoded even if the angle is only modulated and sensed in a single plane). Furthermore, in various embodiments, the constellation code approach may be extended to include the z-axis to define a three-dimensional constellation code. In that sense, the additional information encoded within each symbol may increase security, as the modulation required to generate or read the magnetic field 106 may become more difficult from any significant distance.

In addition, the magnetic communication method may be asynchronous, in that no external clock signal may be needed. Instead, the timing required to recover data from the communication symbols may be encoded within the communication symbols, which may enable a variable bit rate. However, the smallest angle that can be reliably resolved, and the rate at which new communication symbols can be received, will depend on the capabilities associated with the receiver device 120 and any other magnetic disturbances that may or may not be present in the environment, which may in turn represent key factors in determining the maximum data rate that can be achieved. Nonetheless, because the magnetic field 106 has a strength that obeys an inverse cube law with respect to distance, the transmitter device 110 will generally have a substantially greater influence on the receiver device 120 when located in close proximity to the receiver device 120 relative to more distant magnetic interference sources.

According to various aspects, using the angle according to which the magnetic field 106 changes or otherwise rotates in order to convey the data from the transmitter device 110 to the receiver device 120 may be advantageous in the sense that the signal would be very difficult to produce at the receiver device 120 in the event that the transmitter device 110 were any significant distance away. In particular, producing the magnetic field 106 at the receiver device 120 may be difficult from any significant distance because the angle according to which the magnetic field 106 is rotated (which is used to encode the data communicated from the transmitter device 110 to the receiver device 120) needs to be approximately centered on the receiver device 120. Although an intruder could theoretically center the rotation angle on the receiver device 120 using a physically large apparatus that encircles the receiver device 120 (e.g., some induction loops laid out to encircle an entire building or perhaps a system with several coordinated point sources), such an installation would be impractical and difficult to arrange on a covert basis. Moreover, unlike an electromagnetic wave, the magnetic field 106 has a strength (or intensity) that obeys the inverse cube law with respect to distance, whereby producing the magnetic field 106 becomes increasingly difficult from farther distances. Accordingly, the magnetic communication method as described herein may inherently provide robust security due to the physical proximity needed to enable the magnetic communication between the transmitter device 110 and the receiver device 120.

According to various aspects, the magnetic communication method as described herein may therefore have various applications and/or be suitably applied in various devices that have suitable magnetic components. For example, in various embodiments, the magnetic communication method may be employed in a wireless charging system, whereby a transmitter can be added to a charger device and arranged to use the charging magnetic components and drive circuitry at a negligible incremental cost. In another example application, the magnetic communication method may be used to convey out-of-band (OOB) data between the transmitter device 110 and the receiver device 120 to enable authentication prior to proceeding with communication using another technology such as Bluetooth. In another possible implementation, as mentioned above, the magnetic field source 114 may be a permanent magnet that generates a persistent magnetic field without an electrical power source 112 (e.g., a magnet made from rare earth metals or other suitable ferromagnetic materials). In such implementation(s), the energy required to rotate the permanent magnet and thereby modulate the angle associated with the magnetic field 106 could be harvested from a human user (e.g., via a dial with a spring return) and/or through other suitable mechanical means. Furthermore, although the foregoing description explains the magnetic communication method according to a uni-directional data transfer from the transmitter device 110 to the receiver device 120, those skilled in the art will appreciate that bi-directional data transfer may be suitably implemented assuming that the receiver device 120 also has suitable magnetic field-generating components. In that case, the roles may simply be reversed between the transmitter device 110 and the receiver device 120, wherein a collision avoidance protocol may be implemented to ensure that both devices 110, 120 do not energize local magnetic components at substantially the same time.

Figure 3:
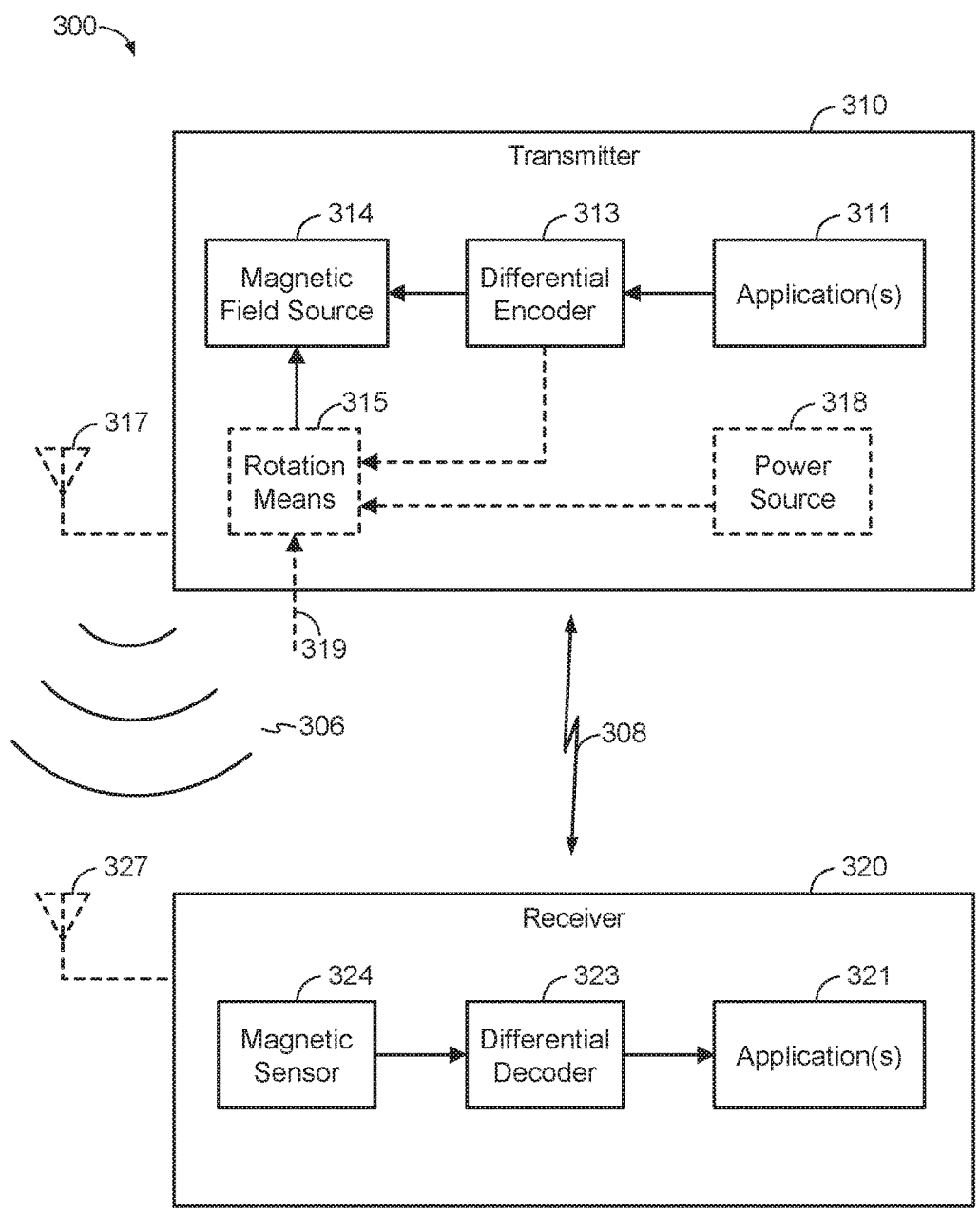
FIG. 3 illustrates another exemplary system to enable magnetic communication between a transmitter device and a receiver device, according to various aspects.

According to various aspects, FIG. 3 illustrates another exemplary system 300 to enable magnetic communication between a transmitter device 310 and a receiver device 320. For example, like the system 100 shown in FIG. 1, the magnetic communication between the transmitter device 310 and the receiver device 320 may be performed without using induction, thereby avoiding the need to have a magnetic loop antenna in the receiver device 320. Furthermore, as mentioned above, the magnetic communication between the transmitter device 310 and the receiver device 320 may at least partially overlap with use cases that can be supported via RFID and NFC, whereby the magnetic communication between the transmitter device 310 and the receiver device 320 may provide an underlying transport mechanism to support applications based on RFID and NFC. As such, the magnetic communication as described herein may effectively replace RFID and NFC transports and thereby enable applications that implement magnetic communication without using RFID or NFC radio technology (including some that currently use RFID and/or NFC). Furthermore, the magnetic communication between the transmitter device 310 and the receiver device 320 as described herein may complement and/or support applications via Bluetooth, wireless local area network (WLAN), and/or other suitable technologies (e.g., to securely transfer out-of-band (OOB) data that can be used to establish wireless connections that use such transports). Accordingly, in various embodiments, a communication channel 308 may be formed between the transmitter device 310 and the receiver device 320, wherein the communication channel 308 may be an RFID channel, an NFC channel, a Bluetooth channel, a WLAN channel, and/or any other suitable channel over which data can be communicated between the transmitter device 310 and the receiver device 320. In various embodiments, the communication channel 308 may be separate from a magnetic field 306 used to transfer data from the transmitter device 310 to the receiver device 320, or the communication channel 308 may alternatively be combined with or otherwise associated with the magnetic field 306. As such, in various embodiments, the transmitter device 310 and the receiver device 320 may optionally include wireless antenna 317, 327 (e.g., to enable communication via NFC, Bluetooth, WLAN, etc.), although the wireless antenna 317, 327 may not be required to perform the magnetic communication method as described herein.

In various embodiments, the system 300 shown in FIG. 3 may further enable uni-directional data transfer from the transmitter device 310 to the receiver device 320 and/or bi-directional data transfer between the transmitter device 310 and the receiver device 320. In the latter case, the transmitter device 310 may further include components similar to those present at the receiver device 320 and vice versa, whereby the transmitter device 310 and the receiver device 320 may reverse roles to transmit or receive data and implement a collision avoidance protocol to ensure that both device 310, 320 do not energize local magnetic components at substantially the same time.

According to various aspects, the transmitter device 310 may include a magnetic field source 314 that can generate the magnetic field 306 and rotate the magnetic field 306 through electrical and/or mechanical means. For example, in various embodiments, the magnetic field source 314 may be coupled to a rotation means 315 that can rotate or otherwise modulate the magnetic field 306 in a controlled direction (e.g., a motor, an actuator, one or more springs, and/or any other suitable device that may cause rotations in the magnetic field 306 that the magnetic field source 314 generates). As such, in various embodiments, the rotation means 315 may optionally include or be coupled to an electrical power source 318, which may drive the rotation means 315 and thereby cause the magnetic field source 314 to generate the magnetic field 306 in a controlled direction (e.g., based on suitable instructions from a differential encoder 313, as discussed in further detail below). Alternatively, as mentioned above, the magnetic field source 314 may be a permanent magnet that generates a persistent magnetic field (e.g., a magnet made from rare earth metals or other suitable ferromagnetic materials). As such, the electrical power source 318 may be optional in that an energy 319 required to rotate the permanent magnet via the rotation means 315, and thereby modulate the angle associated with the magnetic field 306, could be harvested from a human user. In that sense, the rotation means 315 may comprise a dial with a spring return and/or other suitable mechanical means through which the energy 319 to drive the rotation means 315 may be harvested. In yet another alternative, in embodiments where the magnetic field source 314 controls the direction of the magnetic field 306 through an arrangement that uses two or more orthogonal solenoids, the transmitter device 310 may not require the rotation means 315, as the transmitter device 310 may instead cause the magnetic field 306 to rotate through supplying the two or more orthogonal solenoids with controlled amounts of electrical current in varying proportions.

According to various aspects, when the transmitter device 310 is placed in close proximity to the receiver device 320, the magnetic field 306 generated at the transmitter device 310 may be significantly stronger than the Earth's magnetic field at that location. Accordingly, in the event that the magnetic field 306 changes direction, a magnetic sensor 324 at the receiver device 320 may detect the change in direction and generate an output to report the angle to an application 321 on the receiver device 320. As such, the magnetic communication between the transmitter device 310 and the receiver device 320 may generally use the direction (e.g., the angle) associated with the magnetic field 306 as a variable upon which to encode/decode and thereby provide a mechanism through which the receiver device 320 can receive data from the transmitter device 310. For example, according to various aspects, the magnetic communication method described herein may generally enable an application 311 at the transmitter device 310 to transfer data to the application 321 at the receiver device 320 (and vice versa when the applications 311, 321 are implementing the magnetic communication method to perform a bi-directional data transfer).

As such, in various embodiments, the data to be sent to the receiver device 320 may be provided from the application 311 to the differential encoder 313 at the transmitter device 310, wherein the differential encoder 313 may encode the data to be sent to the receiver device 320 according to one or more rotation angles associated with the magnetic field 306. In one embodiment, the differential encoder 313 may use a simple encoding scheme whereby the magnetic field 306 is rotated according to a certain angle to represent one or more bits per symbol, wherein the angle may be fixed or predetermined, varied according to a particular pattern or algorithm, etc. For example, an encoding scheme may rotate the magnetic field 306 clockwise according to a first angle (e.g., ninety degrees) to represent a binary digit one (1) and rotate the magnetic field 306 counter-clockwise according to a second angle (e.g., negative ninety degrees) to represent a binary digit zero (0). As such, to encode a four-bit data word that comprises the sequence "0110" according to the above-mentioned example encoding scheme, the differential encoder 313 may generate symbols, instructions, or other suitable information to cause the magnetic field 306 to rotate counter-clockwise (zero), then rotate clockwise (one), again rotate clockwise (one), and finally rotate counter-clockwise (zero) to represent the data word to be transmitted to the receiver device 320. In a similar respect, the magnetic sensor 324 at the receiver device 320 may detect the magnetic field 306 and the rotations associated therewith and generate appropriate outputs to a differential decoder 323. Accordingly, based on the magnetic sensor 324 sensing an initial direction associated with a magnetic field 306 that is subsequently rotated counter-clockwise, clockwise, clockwise, and counter-clockwise, the differential decoder 323 may decode the "0110" data word and provide the decoded data word to the application 321 at the receiver device 320.

According to various embodiments, those skilled in the art will appreciate that the above-described encoding scheme is intended solely to be illustrative and that other suitable encoding schemes may be suitably employed. In any case, because the simple differential encoding scheme employs rotation angles to encode binary data bits, the simple differential encoding scheme may advantageously eliminate a need to establish a fixed reference position between the transmitter device 310 and the receiver device 320. In that sense, the transmitter device 310 and the receiver device 320 can be held in any arbitrary orientation with respect to one another. However, to achieve use cases with higher data rates, a constellation code or other suitable techniques may be used to encode the data communicated between the transmitter device 310 and the receiver device 320. For example, in various embodiments, the constellation code may employ more rotation angles in order to encode more than one bit per symbol, and the constellation code approach may be extended to include the z-axis to define a three-dimensional constellation code. In that sense, the additional information encoded within each symbol may increase security, as the modulation required to generate or read the magnetic field 306 may become more difficult from any significant distance. In addition, the magnetic communication between the transmitter device 310 and the receiver device 320 may be asynchronous (e.g., without requiring an external clock signal), as the timing required to recover data from the communication symbols may be encoded within the communication symbols, thus enabling a variable bit rate. Nonetheless, the smallest angle that can be reliably resolved and the rate at which new communication symbols can be received will depend on the capabilities associated with the receiver device 320 and any other magnetic disturbances that may or may not be present in the environment, which may in turn represent key factors in determining the maximum data rate that can be achieved. Nonetheless, owing at least in part to the inverse cube law, the transmitter device 310 will generally have a substantially greater influence on the receiver device 320 when located in close proximity to the receiver device 320 relative to more distant magnetic interference sources.

Figure 4:
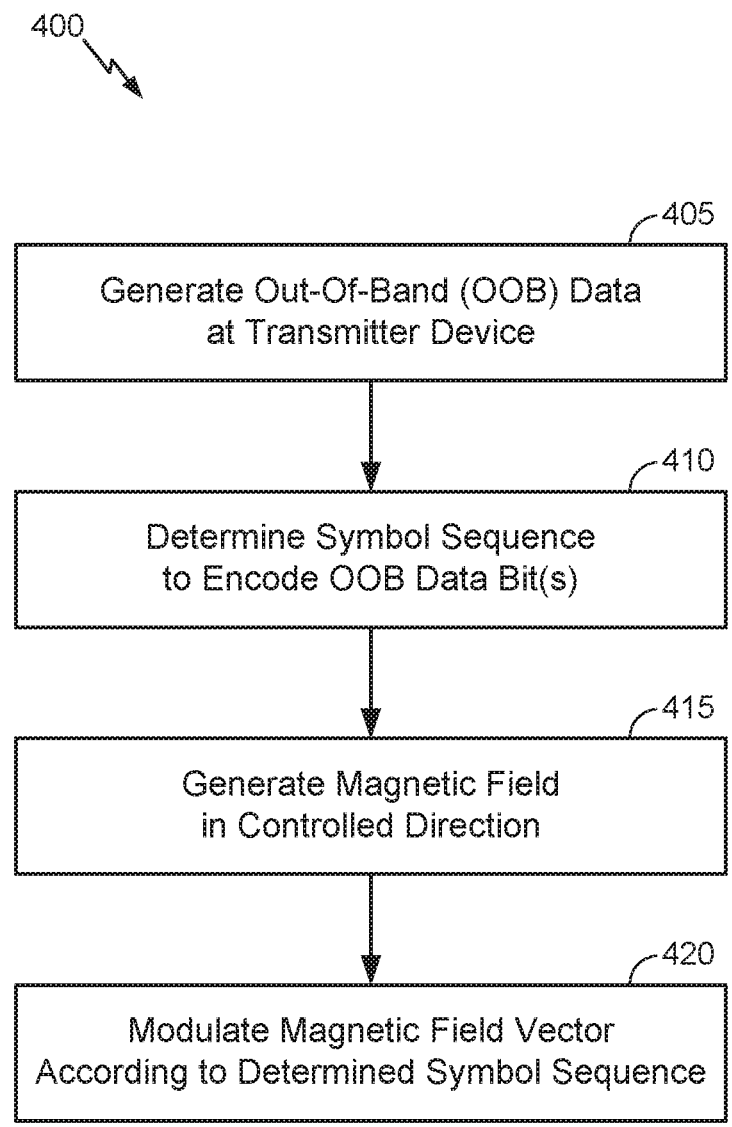
FIG. 4 illustrates an exemplary magnetic communication method that may be performed at a transmitter device, according to various aspects.

According to various aspects, FIG. 4 illustrates a magnetic communication method 400 that may be performed at a transmitter device, such as the transmitter device 110 shown in FIG. 1, the transmitter device 310 shown in FIG. 3, etc. In various embodiments, the transmitter device may generally include a magnetic field source that can generate a magnetic field in a controlled direction and suitable means to modulate a direction associated with the magnetic field. In that sense, the transmitter device may rotate the magnetic field around one or more axes such that one or more angles according to which the magnetic field is rotated may be used to encode data to be transmitted from the transmitter device to a receiver device.

Accordingly, at block 405, an application at the transmitter device may generate out-of-band (OOB) data to be transmitted to the receiver device. For example, the OOB data may include one or more binary data words that can be encoded according to a simple differential encoding scheme whereby the magnetic field generated at the transmitter device is rotated according to a first angle to encode a binary digit one (1) and rotated in another direction, according to a second angle, or according to another suitable scheme to encode a binary digit zero (0). Alternatively, the OOB data may include more than one bit per symbol to achieve a higher data rate, which may be realized, for example, using a constellation code and more than one rotation angle (e.g., four data bits may be transmitted in each symbol to result in a bit rate of four times the symbol rate). In any case, at block 410, an appropriate symbol sequence to encode the OOB data bit(s) may be determined, which may depend on the particular data rate and the bits per symbol that are to be encoded. For example, in one embodiment, the smallest angle that can be reliably resolved at the receiver device, the rate at which new communication symbols can be received at the receiver device, any other magnetic disturbances that may or may not be present in the environment, and/or other suitable factors may be relevant to determining the maximum data rate that can be achieved and thus the appropriate symbol sequence to encode the OOB data bits.

In various embodiments, at block 415, the transmitter device may generate the magnetic field in a controlled direction, wherein the receiver device may detect the magnetic field generated at the transmitter device when the transmitter device is placed in sufficient proximity thereto. As mentioned above, the scheme used to encode the OOB data bits to be sent from the transmitter device to the receiver device may depend on rotations in the magnetic field generated at the transmitter device. The transmitter device and the receiver device can therefore be held in any arbitrary orientation with respect to one another without requiring any fixed reference position, whereby the initial magnetic field generated at block 415 may instead provide the reference position from which subsequent rotations in the magnetic field are used to encode/decode data. Furthermore, in various embodiments, a known preamble sequence or header may be added to the data to assist the receiver device in dynamically determining the reference position. As such, in various embodiments, the transmitter device may modulate the magnetic field vector at block 420 (e.g., the direction associated with the magnetic field), wherein the magnetic field vector may be modulated according to the symbol sequence determined in block 410 (i.e., the transmitter device may cause the magnetic field to rotate around one or more axes according to one or more appropriate angles to represent each symbol in the symbol sequence). In various embodiments, the data transmitted from the transmitter device to the receiver device may then be used to enable various applications (e.g., authentication, file transfer, etc.).

Figure 5:
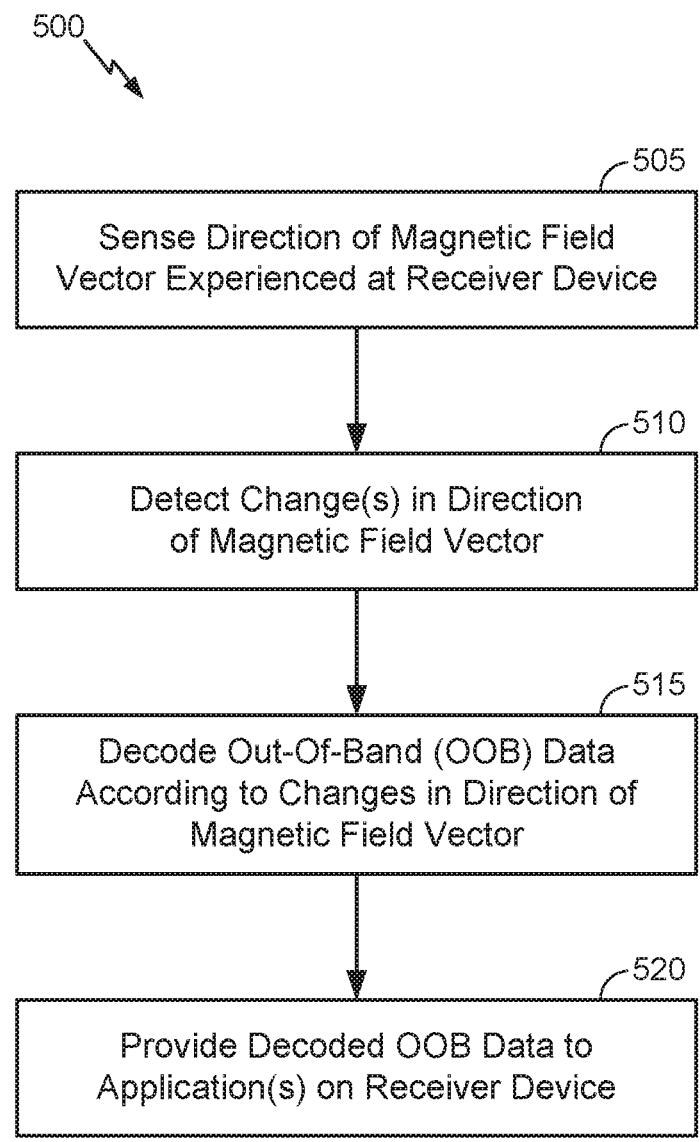
FIG. 5 illustrates an exemplary magnetic communication method that may be performed at a receiver device, according to various aspects.

According to various aspects, FIG. 5 illustrates a magnetic communication method 500 that may be performed at a receiver device, such as the receiver device 120 shown in FIG. 1, the receiver device 320 shown in FIG. 3, etc. For example, in various embodiments, the receiver device may generally include a magnetic sensor that can sense the direction associated with a magnetic field. Accordingly, when a transmitter device having capabilities to generate and rotate a magnetic field is placed in sufficient proximity to the receiver device, the magnetic field generated at the transmitter device may be substantially stronger than the Earth's magnetic field at that location. As such, at block 505, the receiver device may sense the direction associated with the magnetic field vector experienced at the receiver device, as influenced by the magnetic field generated at the transmitter device. Furthermore, at block 510, the receiver device may subsequently detect one or more changes in the direction associated with the magnetic field vector experienced at the receiver device, as influenced by the transmitter device rotating the magnetic field generated thereby. In particular, the transmitter device may rotate the magnetic field around one or more axes according to one or more angles to encode data to be transmitted to the receiver device. In various embodiments, at block 515, the receiver device may therefore decode out-of-band (OOB) data transmitted from the transmitter device according to one or more angles at which the magnetic field is rotated and a sequence in which the rotations occur. In various embodiments, at block 520, the decoded OOB data may then be provided to a suitable consuming application on the receiver device (e.g., an authentication application that uses the OOB data as a shared secret, a file transfer application, etc.).

Figure 6:
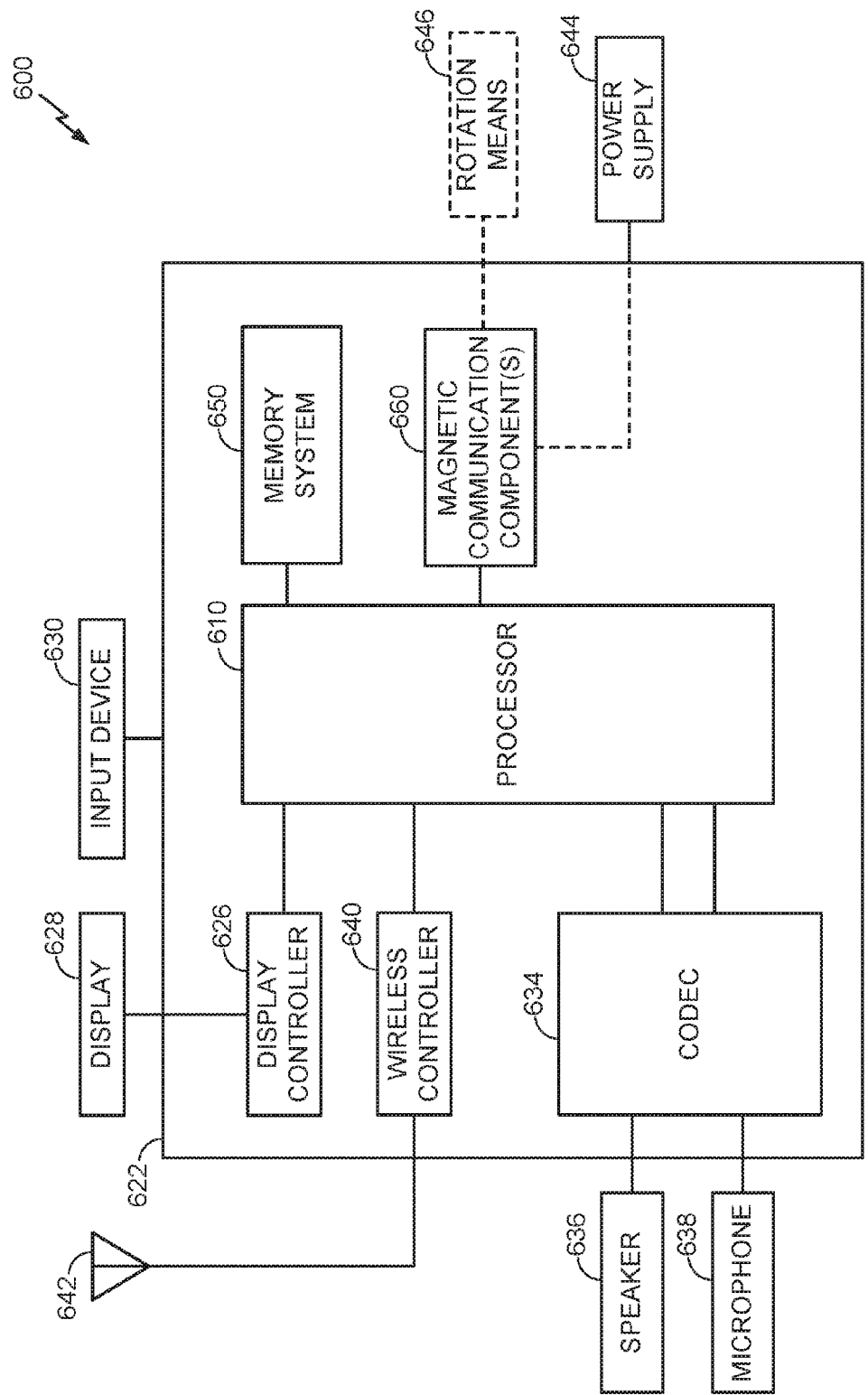
FIG. 6 illustrates an exemplary processing device that may advantageously implement the various aspects described herein.

According to various aspects, FIG. 6 illustrates an exemplary processing device 600 that may advantageously implement the various aspects described herein. In various embodiments, the processing device 600 may be configured as a wireless device. The processing device 600 can include or otherwise implement one or more aspects discussed in further detail above with reference to FIG. 1 through FIG. 5, whereby the processing device 600 may at least include one or more magnetic communication components 660 that can be used to carry out the magnetic communication method(s) described in further detail above. For example, in various embodiments, the processing device 600 may be configured as the transmitter device 110, 310 described in further detail above, in which case the one or more magnetic communication components 660 may include at least a magnetic field source that can generate and rotate a magnetic field in a controlled direction. Furthermore, when configured as the transmitter device 110, 310, the processing device 600 may optionally couple the one or more magnetic communication components 660 to a power supply 644 that can be used to drive the one or more magnetic communication components 660 and thereby modulate the magnetic field generated therewith. Alternatively, the one or more magnetic communication components 660 may include a permanent magnet that does not require an electrical power source, in which case the one or more magnetic communication components 660 may be coupled to mechanical rotation means 646 from which to harvest the energy required to rotate the permanent magnet and thereby modulate the angle associated with the magnetic field that the one or more magnetic communication components 660 generate. Furthermore, in various embodiments, the processing device 600 may be configured as the receiver device 120, 320 described in further detail above, in which case the one or more magnetic communication components 660 may include at least a magnetic sensor that can sense a direction of a magnetic field in a coordinate space that includes two or more orthogonal axes. Further still, in various embodiments, the processing device 600 may be configured as both the transmitter device 110, 310 and the receiver device 120, 320, in which case the processing device 600 may implement the functions and components associated with both the transmitter device 110, 310 and the receiver device 120, 320 with the active components and functions depending on whether the processing device 600 is currently acting in the transmitter or receiver role (e.g., in an application that employs the magnetic communication method to perform a bi-directional data transfer).

According to various embodiments, as shown in FIG. 6, the processing device 600 may include a processor 610, which can be a digital signal processor (DSP) or any general purpose processor or central processing unit (CPU) as known in the art, for example. The processor 610 may be communicatively coupled to a memory system 650, which may be configured to store instructions, data, and/or other suitable information associated with one or more applications that may execute on the processor 610 and implement the magnetic communication method described therein. According to various embodiments, FIG. 6 also shows that the processing device 600 may include a display controller 626 coupled to the processor 610 and to a display 628. The processing device 600 may further include a coder/decoder (CODEC) 634 (e.g., an audio and/or voice CODEC) coupled to processor 610. Other components, such as a wireless controller 640 (e.g., a modem) are also illustrated in FIG. 6. In various embodiments, a speaker 636 and a microphone 638 can be coupled to the CODEC 634. Furthermore, according to various embodiments, the wireless controller 640 can be coupled to a wireless antenna 642 as shown in FIG. 6.

According to various aspects, the processor 610, the display controller 626, the memory system 650, the CODEC 634, the wireless controller 640, and/or the magnetic communication components 660 may be included or otherwise provided in a system-in-package or a system-on-chip device 622. In various embodiments, an input device 630 may be coupled to the system-on-chip device 622. Moreover, as illustrated in FIG. 6, the display 628, the input device 630, the speaker 636, the microphone 638, the wireless antenna 642, and the power supply 644 are external to the system-on-chip device 622. However, those skilled in the art will appreciate that the display 628, the input device 630, the speaker 636, the microphone 638, the wireless antenna 642, and/or the power supply 644 can be coupled to a component associated with the system-on-chip device 622 (e.g., via an interface or a controller). Furthermore, although FIG. 6 depicts the processing device 600 as a wireless device, those skilled in the art will appreciate that the processor 610, the memory system 650, the magnetic communication components 660, etc. may also be integrated into a set top box, a music player, a video player, an entertainment unit, a navigation device, a personal digital assistant (PDA), a fixed location data unit, a computer, a laptop, a tablet, a communications device, a mobile phone, an electronic lock, an Internet of Things (IoT) device, or other similar devices.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for transmitting data using magnetic communication, comprising:
    generating, at a transmitter device, one or more communication symbols, wherein the one or more communication symbols represent an authentication code configured to enable authentication of a wireless connection between the transmitter device and a receiver device;
    transferring the authentication code to the receiver device, wherein the transferring comprises:
        generating a magnetic field at the transmitter device; and
        rotating the magnetic field around one or more axes to encode the one or more communication symbols; and
    establishing the wireless connection between the transmitter device and the receiver device in response to a determination that the authentication code has been transferred to the receiver device.

2. The method recited in claim 1, wherein the one or more communication symbols comprise one or more binary data bits.

3. The method recited in claim 2, wherein rotating the magnetic field around the one or more axes to encode the one or more communication symbols to be transmitted to the receiver device comprises:
    rotating the magnetic field around a first axis according to a first angle to encode a binary digit zero; and
    rotating the magnetic field around the first axis according to a second angle to encode a binary digit one.

4. The method recited in claim 1, wherein the one or more communication symbols each represent multiple data bits.

5. The method recited in claim 4, wherein the magnetic field is rotated around at least a first axis according to a first angle and further rotated around a second axis according to a second angle to represent each communication symbol.

6. The method recited in claim 4, wherein the magnetic field rotated within a two-dimensional plane according to at least a first angle that has a first size and according to a second angle that has a second size to represent each communication symbol.

7. The method recited in claim 1, wherein the transmitter device comprises a magnetic field source configured to generate the magnetic field.

8. The method recited in claim 7, wherein the transmitter device further comprises an electrical power source configured to drive the magnetic field source and to cause the magnetic field source to rotate the magnetic field.

9. The method recited in claim 7, wherein the magnetic field source comprises a permanent magnet configured to generate a persistent magnetic field and one or more mechanical components coupled to the permanent magnet that are configured to cause the permanent magnet to rotate such that the persistent magnetic field rotates.

10. A transmitter device, comprising:
    a processor configured to generate one or more communication symbols, wherein the one or more communication symbols represent an authentication code configured to enable authentication of a wireless connection between the transmitter device and a receiver device;
    a magnetic field source configured to transfer the authentication code to the receiver device, wherein to transfer the authentication code, the magnetic field source is configured to:
        generate a magnetic field at the transmitter device; and
        rotate around one or more axes to encode the one or more communication symbols;
    a transceiver system, wherein the processor and transceiver system are configured to establish the wireless connection between the transmitter device and the receiver device in response to a determination that the authentication code has been transferred to the receiver device.

11. The transmitter device recited in claim 10, wherein the one or more communication symbols comprise one or more binary data bits.

12. The transmitter device recited in claim 11, wherein the processor is further configured to:
    cause the magnetic field to rotate around a first axis according to a first angle to encode a binary digit zero; and
    cause the magnetic field to rotate around the first axis according to a second angle to encode a binary digit one.

13. The transmitter device recited in claim 10, wherein the one or more communication symbols each represent multiple data bits.

14. The transmitter device recited in claim 13, wherein the processor is further configured to rotate the magnetic field around one or more axes according to multiple different angles to represent each communication symbol.

15. The transmitter device recited in claim 10, further comprising:
    an electrical power source configured to drive the magnetic field source and to cause the magnetic field to rotate according to instructions from the processor.

16. The transmitter device recited in claim 10, wherein the magnetic field source comprises a permanent magnet and the transmitter device further comprises one or more mechanical components coupled to the permanent magnet, the one or more mechanical components arranged to cause the permanent magnet to rotate such that the magnetic field rotates when energy is applied to the one or more mechanical components.

17. An apparatus, comprising:
- means for generating, at a transmitter device, one or more communication symbols, wherein the one or more communication symbols represent an authentication code configured to enable authentication of a wireless connection between the transmitter device and a receiver device;
- means for transferring the authentication code to the receiver device, wherein the means for transferring comprises:
  - means for generating a magnetic field; and
  - means for rotating the magnetic field around one or more axes to encode the one or more communication symbols; and
- means for establishing the wireless connection between the transmitter device and the receiver device in response to a determination that the authentication code has been transferred to the receiver device.

18. A non-transitory computer-readable storage medium storing computer-executable instructions, the stored computer-executable instructions configured to cause a transmitter device to:
- generate, at a transmitter device, one or more communication symbols, wherein the one or more communication symbols represent an authentication code configured to enable authentication of a wireless connection between the transmitter device and a receiver device;
- transfer the authentication code to the receiver device, wherein the transferring comprises:
  - generate a magnetic field; and
  - rotate the magnetic field around one or more axes to encode the one or more communication symbols; and
- establish the wireless connection between the transmitter device and the receiver device in response to a determination that the authentication code has been transferred to the receiver device.

19. A method for receiving data using magnetic communication, comprising:
- sensing, at a receiver device, a direction associated with a magnetic field vector experienced at the receiver device;
- detecting, at the receiver device, one or more rotations in the magnetic field vector experienced at the receiver device based on one or more changes in the sensed direction associated with the magnetic field vector;
- decoding, at the receiver device, one or more communication symbols based on the one or more rotations in the magnetic field vector, wherein the one or more decoded communication symbols represent an authentication code configured to enable authentication of a wireless connection between the receiver device and a transmitter device
- authenticate the transmitter device for the wireless connection based on the authentication code; and
- establish the wireless connection between the transmitter device and the receiver device in response to a determination that the transmitter device has been authenticated.

20. The method recited in claim 19, wherein the one or more communication symbols comprise one or more binary data bits.

21. The method recited in claim 20, wherein decoding the one or more communication symbols comprises:
- decoding a rotation in the magnetic field vector around a first axis according to a first angle as a binary digit zero; and
- decoding a rotation in the magnetic field vector around the first axis according to a second angle as a binary digit one.

22. The method recited in claim 19, wherein the one or more communication symbols each represent multiple data bits.

23. The method recited in claim 22, wherein decoding the one or more communication symbols comprises decoding the multiple data bits in each communication symbol based on multiple different angles according to which the magnetic field vector is rotated around one or more axes.

24. A receiver device, comprising:
- a magnetic sensor configured to sense a direction associated with a magnetic field vector experienced at the receiver device and to detect one or more rotations in the magnetic field vector experienced at the receiver device based on one or more changes in the sensed direction associated with the magnetic field vector;
- a processor configured to:
  - decode one or more communication symbols based on the one or more rotations in the magnetic field vector, wherein the one or more decoded communication symbols represent an authentication code configured to enable authentication of a wireless connection between the receiver device and a transmitter device; and
  - authenticate the transmitter device for the wireless connection based on the authentication code; and
- a transceiver system, wherein the processor and transceiver system are configured to establish the wireless connection between the transmitter device and the receiver device in response to a determination that the transmitter device has been authenticated.

25. The receiver device recited in claim 24, wherein the magnetic sensor is configured to sense the direction associated with the magnetic field vector within a space that comprises two or more orthogonal axes.

26. An apparatus, comprising:
- means for sensing a direction associated with a magnetic field vector experienced at the apparatus;
- means for detecting one or more rotations in the magnetic field vector experienced at the apparatus based on one or more changes in the sensed direction associated with the magnetic field vector;
- means for decoding one or more communication symbols based on the one or more rotations in the magnetic field vector, wherein the one or more decoded communication symbols represent an authentication code configured to enable authentication of a wireless connection between the receiver device and a transmitter device;
- means for authenticating the transmitter device for the wireless connection based on the authentication code; and
- means for establishing the wireless connection between the transmitter device and the receiver device in response to a determination that the transmitter device has been authenticated.

27. A non-transitory computer-readable storage medium storing computer-executable instructions, the stored computer-executable instructions configured to cause a receiver device to:
- sense a direction associated with a magnetic field vector experienced at the receiver device;
- detect one or more rotations in the magnetic field vector experienced at the receiver device based on one or more changes in the sensed direction associated with the magnetic field vector;

decode one or more communication symbols based on the one or more rotations in the magnetic field vector, wherein the one or more decoded communication symbols represent an authentication code configured to enable authentication of a wireless connection between the receiver device and a transmitter device;
authenticate the transmitter device for the wireless connection based on the authentication code; and
establish the wireless connection between the transmitter device and the receiver device in response to a determination that the transmitter device has been authenticated.

* * * * *